United States Patent Office 3,525,747
Patented Aug. 25, 1970

3,525,747
METHOD FOR PRODUCING HETEROCYCLIC DICARBOXIMIDES
Richard L. Jacobs, Perrysburg, Ohio, assignor, by mesne assignments, to The Sherwin-Williams Company, a corporation of Ohio
No Drawing. Filed June 26, 1968, Ser. No. 740,080
Int. Cl. C07d 51/76
U.S. Cl. 260—250                               11 Claims

ABSTRACT OF THE DISCLOSURE

A method for producing 2,3- and 3,4-pyridinedicarboximides and 2,3-pyrazinedicarboximides, which is accomplished by anhydrous alkylation of the corresponding imide precursors with an organic halide in the presence of sodium hydride or equivalent and a suitable solvent.

BACKGROUND OF THE INVENTION

This invention relates to a method for producing intermediate compounds which are useful in the production of compounds which have been found to have utility as plant growth regulators, selective weed killers, defoliating agents, and as agricultural chemicals.

In modern day agriculture, chemicals are used extensively for weed and plant control, and as defoliating agents. Many different types of chemical agents are being used, having varying degrees of herbicidal activity. While the chemicals currently used are in general adequate, they are sufficiently expensive that expense is a significant factor in their use. Therefore, new compounds and inexpensive methods for producing such compounds are constantly being sought.

In addition, while many compounds presently on the market are effective against certain species of weeds, they are ineffective against others. Thus, new herbicides which have broad spectrum effectiveness against a wide variety of weeds are continually being sought.

It has been discovered that certain substituted-pyrido[3,2-d]pyrimidine-2,4(1H,3H)-diones, some analogous [2,3-d], [3,4-d] and [4,3-d] compounds, and certain lumazines have unexpectedly high levels of herbicidal activity.

The instant invention is directed to a method of making intermediate compounds which are used in the production of the aforementioned pyridopyrimidinediones and lumazines.

It is an object of this invention to provide a new method for producing chemicals which are useful in the production of compounds which selectively kill weeds or regulate plant growth.

It is another object of this invention to provide a method for making N-substituted 2,3- and 3,4-pyridinedicarboximides and N-substituted 2,3-pyrazinedicarboximides whereby such compounds may be made available at a relatively low cost.

Other objects and benefits of this invention will be apparent from the following disclosure.

The method of this invention comprises reacting (a) a heterocyclic dicarboximide selected from those having the structural formula

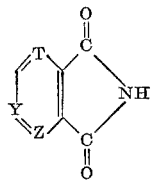

wherein each of T, Y and Z is nitrogen or CH and at least one is CH and at least one is nitrogen, and wherein when Y is nitrogen, T and Z are CH, with (b) an organic halide having the formula RX wherein R is a member of the group consisting of alkyl groups having from 1 to 8 carbon atoms, substituted alkyl groups having not more than 8 carbon atoms, where the substituent is monocarbocyclic phenyl, cycloalkyl groups having from 3 to 12 carbon atoms, alkenyl groups having not more than 8 carbon atoms, and alkynyl groups having not more than 8 carbon atoms, and X is chlorine, bromine, or iodine, said reaction being carried out at temperatures ranging from about 0° to about 80°,[1] and in the presence of an alkali metal or alkaline earth metal hydride and a solvent selected from the group consisting of dimethylformamide, dimethylsulfoxide and dimethylacetamide.

The reaction can be generally illustrated as follows:

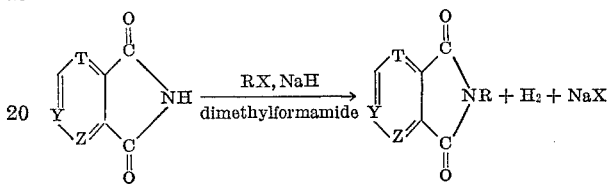

Imides which are useful as the starting compounds in the practice of this invention are 2,3-pyridinedicarboximide, 3,4-pyridinedicarboximide, and 2,3-pyrazinedicarboximide. All dicarboximides within the foregoing formula can be produced by known methods. (Ber. 58, 1727 (1925): J. Org. Chem., 14, 97 (1949).)

The organic halides are all readily made by known methods and most are commercially available. The preferred organic halides for use in this invention when R is branched are those wherein the halogen is iodine.

The preferred alkali metal hydride is sodium hydride. Other suitable hydrides include potassium hydride, lithium hydride, calcium hydride and magnesium hydride.

The function of the alkali- or alkaline earth-metal hydride in the reaction is to form the N-metal salt of the imide, thus facilitating reaction of the imide with the organic halide.

The preferred solvent for use in carrying out the method of this invention is dimethylformamide. Other suitable solvents include dimethylacetamide and dimethylsulfoxide. Sufficient solvent must be used to allow the reaction to proceed. The exact quantity is immaterial, but it is preferred that there be at least about 1 mole percent of solvent present per mole of starting imide.

The above stated reaction desirably is conducted within the temperature range of about 0° to about 80°. Preferably, the reaction is conducted at a temperature of about 25°–50°.

The order of addition of the reactants is substantially immaterial; however, it has been found that when R is a branched alkyl group better yields are obtained when RX is added last.

This invention can be more clearly understood by reference to the following examples. It is not intended, however, that the invention be limited thereby.

EXAMPLE I

Preparation of N-isopropyl-3,4-pyridinedicarboximide

A 500-ml. three-necked flask equipped witeh a thermometer, stirrer, condenser, addition funnel and nitrogen atmosphere system, was charged with 50 ml. anhydrous dimethylformamide and 7.2 g. sodium hydride in the form of a 50% mineral oil suspension and the nitrogen atmosphere was started. Agitation was begun and was continued throughout the duration of the reaction. An ice bath was applied to the flask to cool the mixture to a tem- ---
[1] All temperatures reported herein are in degrees centigrade unless indicated otherwise.

perature of 3°. A solution of 22.2 g. 3,4-pyridinedicarboximide in 250 ml. anhydrous dimethylformamide was then charged to the flask over a period of about one hour, after which 26.0 g. 2-iodopropane was charged in about 4 minutes. During the charging of the reactants to the flask, the temperature of the flask contents was maintained below 10°. At the end of the charging period the temperature was allowed to reach room temperature and the stirring was continued for an additional 5¼ hours, after which the stirring was discontinued and the reaction mixture permitted to stand overnight under a nitrogen atmosphere. At the end of this time, the mixture was in the form of a brown slurry. Heat was applied to bring the temperature of the reaction mixture to 72° at which point all of the solids were in solution. The solution had a dark red color. A temperature of about 77° was then maintained for about 45 minutes, after which the solution was allowed to cool. Vacuum distillation was begun, and 200 ml. dimethylformamide was removed. The remaining solution was quenched into 900 ml. tap water and stirred for ½ hour, and the solids formed were then removed by filtration. The solids were filtered, washed several times with water, and dried. There was obtained 15.6 g. of N-isopropyl-3,4-pyridinedicarboximide having a melting point of 103–107°, and representing 54.7% of the theoretical yield.

The product was subjected to elemental analysis with the following results:

| Element | Theory, percent | Found, percent |
|---|---|---|
| Carbon | 63.148 | 64.14 |
| Hydrogen | 5.300 | 5.62 |
| Nitrogen | 14.728 | 14.63 |

The product was further characterized by infrared analysis and by chemical reactions.

Dimethylacetamide or dimethylsulfoxide can be used instead of dimethylformamide as the solvent for the above reaction with substantially equivalent results.

EXAMPLE II

Preparation of N-isopropyl-2,3-pyridinedicarboximide

A 1000-ml., three-necked flask equipped with a stirrer, condenser, thermometer, addition funnel and nitrogen atmosphere system, was charged with 50 ml. anhydrous dimethylformamide and 9.6 g. sodium hydride in the form of a 50% mineral oil suspension. The flask was then charged with 34 g. 2-iodopropane which caused the temperature of the flask contents to rise to 37°. Agitation of the flask contents was begun and continued throughout the duration of the reaction. A water bath was applied to reduce the temperature to about 27° after which ice was added to the water bath to reduce the temperature to 2°. The time for cooling to 2° was about 1½ hours. The temperature was kept below about 8° during the charging of 29.6 g. 2,3-pyridinedicarboximide in 300 ml. anhydrous dimethylformamide over a period of about 25 minutes. The ice bath was then removed and the reaction mixture was stirred for 2½ hours during which time the temperature rose to 30°. At the end of this time, solids appeared and the stirring was stopped. A drying tube was placed in the condenser and the dimethylformamide was stripped off under reduced pressure at a temperature of about 50°. The concentrated reaction mixture was then quenched into 1140 ml. water at 20°. The precipitated product was filtered, and washed 6 times with 25 ml. portions of water. There was obtained 20.7 g. N-isopropyl-2,3-pyridinedicarboximide amounting to 54.5% of the theoretical yield. It has a melting point of 105–106°.

The product was subjected to elemental analysis with the following results:

| Element | Theory, percent | Found, percent |
|---|---|---|
| Carbon | 63.147 | 63.73 |
| Hydrogen | 5.30 | 5.65 |
| Nitrogen | 14.73 | 14.02 |

The product was further characterized by infrared analysis and by chemical reactions.

Dimethylacetamide or dimethylsulfoxide can be used instead of dimethylformamide as the solvent for the above reaction with substantially equivalent results.

EXAMPLE III

Preparation of N-ethyl-2,3-pyridinedicarboximide

A 1000-ml., 3-necked flask equipped with a stirrer, a condenser, nitrogen atmosphere system, thermometer and addition funnel was charged with 9.6 g. sodium hydride in the form of a 50% mineral oil suspension, and 50 ml. of anhydrous dimethylformamide. Agitation was begun and was continued throughout the duration of the reaction. An ice bath was then applied to the flask to reduce the temperature of the flask contents to 6°, after which the charging of 29.6 g. 2,3-pyridinedicarboximide in 300 ml. anhydrous dimethylformamide was begun. The charging was made over a period of one hour and was followed by the charging of 21.8 g. ethyl bromide. During the charging of the 2,3-pyridinedicarboximide and the ethyl bromide, the temperature was kept below about 8°. After completion of the charging, the ice bath was removed and the reaction mixture was stirred for about 2½ hours. The dimethylformamide was stripped off under reduced pressure until the volume of the reaction mixture had been reduced to 120 ml. This mixture was quenched into 720 ml. water; the solids were filtered off and dried; and the filtrate was saved. The filtrate was then salted with 313 g. NaCl, and the product was removed by 3 extractions with 100 ml. portions of chloroform. The chloroform was removed by evaporation on a steam bath and the combined yield amounted to 80% of theory. The N-ethyl-2,3-pyridinedicarboximide had a melting point of 109–110°.

The product was subjected to elemental analysis with the following results:

| Element | Theory, percent | Found, percent |
|---|---|---|
| Carbon | 61.3 | 61.0 |
| Hydrogen | 4.6 | 4.8 |
| Nitrogen | 15.9 | 15.9 |

The product was further characterized by infrared analysis and by chemical reactions. The dimethylformamide used as a solvent in the above reaction can be replaced with dimethylacetamide or dimethylsulfoxide with substantially equivalent results.

EXAMPLE IV

Preparation of N-isopropyl-2,3-pyrazinedicarboximide

A 500-ml., 3-necked flask equipped with a stirrer, condenser, thermometer, addition funnel and having a nitrogen atmosphere, was charged at 0–5° with 50 ml. anhydrous dimethylformamide, and 2.6 g. sodium hydride. A light gray slurry formed. Then 14.9 g. 2,3-pyrazinedicarboximide in 100 ml. anhydrous dimethylformamide was charged over a period of about 60 minutes. Agitation of the flask contents was begun during the charging of the 2,3-pyrazinedicarboximide and continued throughout the duration of the reaction. Six minutes after completion of the 2,3-pyrazinedicarboximide addition, 18.9 g. 2-iodopropane was charged. The temperature at this point was about 0°. The temperature rose to 2° at which time the ice bath was removed. The reaction mixture (a dark red wine color) was stirred for 5 hours during which time the temperature rose to 26°. The reaction mixture was allowed to stand over the weekend. The dimethylformamide was stripped off under reduced pressure at a temperature of less than about 50°. The concentrated product (130 ml.) was then quenched into 240 ml. of tap water to precipitate the product, and the solution was stirred for one-half hour. It was then filtered and the filter cake washed and dried. Thereafter the filter cake was taken up in 200 ml. of acetone and the solution heated to reflux and treated with activated carbon two times. The filtrate was then reduced in volume by evaporating to dryness. The dry weight of the product was 5.5 grams.

The filtrate left after the first carbon treatment was salted with NaCl, then filtered and the filter cake dried. The dried product was then taken up in 25 ml. of acetone and the solution filtered and the filtrate evaporated to dryness. The weight of product recovered was 2.4 grams, giving a total product recovery of 7.9 grams. The tan N-isopropyl - 2,3 - pyrazinedicarboximide had a melting point of 111–113°.

The product was subjected to elemental analysis with the following results:

| Element | Theory, percent | Found, percent |
| --- | --- | --- |
| Carbon | 56.539 | 56.84 |
| Hydrogen | 4.745 | 4.85 |
| Nitrogen | 21.978 | 22.73 |

The product was further characterized by infrared analysis and by chemical reactions. Dimethylacetamide or dimethylsulfoxide can be used instead of dimethylformamide as the solvent for the above reaction with substantially equivalent results.

EXAMPLE V

Preparation of N-ethyl-2,3-pyrazinedicarboximide

A 500-ml., 3-necked flask equipped with a stirrer, condenser, thermometer, addition funnel and nitrogen atmosphere, was charged at 6° C. with 50 ml. anhydrous dimethylformamide, and 2.6 g. sodium hydride. A light gray slurry formed. The nitrogen was turned off, then 14.9 g. 2,3-pyrazinedicarboximide in 100 ml. anhydrous dimethylformamide was charged over a period of about 60 minutes. Agitation of the flask contents was begun during the charging of the 2,3-pyrazinedicarboximide and continued throughout the duration of the reaction. Six minutes after completion of the 2,3-pyrazinedicarboximide addition, 12.0 g. bromoethane was charged. The temperature at this point was about 0°. The ice bath was removed. The reaction mixture (a dark red color) was stirred for approximately 5 hours during which time the temperature rose to 24°. The reaction mixture was allowed to stand over the weekend. The dimethylformamide was stripped off under reduced pressure at a temperature of less than about 50°. The concentrated product (20 ml.) was then quenched into 240 ml. of tap water to precipitate the product, and the solution was stirred for 45 minutes. It was then filtered and the filter cake washed and dried. Thereafter the dried filter cake was taken up in 250 ml. of acetone and the solution heated to reflux and treated with activated carbon. The filtrate was then reduced in volume to 40 ml. by evaporating. The filtrate was cooled and filtered. The dry weight of the product was 13.8 grams, and it was white in color.

The product (N-ethyl-2,3-pyrazinedicarboximide) was subjected to elemental analysis with the following results:

| Element | Theory, percent | Found, percent |
| --- | --- | --- |
| Carbon | 54.236 | 54.10 |
| Hydrogen | 3.983 | 3.89 |
| Nitrogen | 23.719 | 23.84 |

The product was further characterized by infrared analysis and by chemical reactions. Dimethylacetamide or dimethylsulfoxide can be used instead of dimethylformamide as the solvent for the above reaction with substantially equivalent results.

The method illustrated in Examples I–V can be used with appropriate substitutions in the production of the balance of the compounds produced by the method of the invention regardless of the nature of R.

The compounds produced by the method of this invention are useful as intermediates in the production of agricultural chemicals and in particular as plant growth regulators or weed killers, and pharmaceuticals.

For example, it has been found that certain 3-substituted-pyrido[3,2-d]-and [2,3-d]pyrimidine-2,4(1H,3H)-diones, and 3-substituted-pyrido[3,4-d] and [4,3-d]pyrimidine-2,4(1H,3H)-diones are effective as weed killers.

It has also been found that 3-substituted-lumazines are effective weed killers.

These compounds can be made from the 2,3-pyridinedicarboximides or pyrazinedicarboximides, or 3,4-pyridinedicarboximides made in accordance with the method of this invention, by carrying out the reactions described below to produce for purposes of illustration, 3-isopropyl-pyrido[3,2-d]pyrimidine-2,4(1H,3H)-dione, a particularly effective weed killer.

A quantity of N-isopropyl-2,3-pyridinedicarboximide is made in accordance with the method of this invention, as illustrated in Example II hereof. The N-isopropyl-2,3-pyridinedicarboximide is then reacted with ammonia in the presence of a solvent such as anhydrous ethanol to form the corresponding amide (actually a mixture of isomeric amides). The reaction is conducted at temperatures ranging from 0° up to 50°. This reaction can be illustrated as follows:

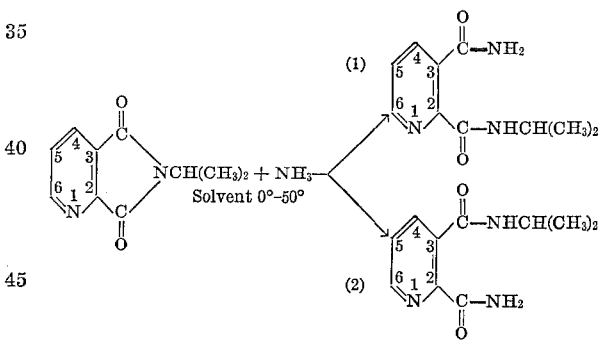

The two isomeric amides thus formed, (1) being $N^2$-isopropyl-2,3-pyridinedicarboxamide, and (2) being $N^3$-isopropyl - 2,3 - pyridinedicarboxamide, are separated, either by preferential precipitation or by column chromatography.

After separation, $N^2$-isopropyl-2,3-pyridinedicarboxamide is reacted with sodium hypochlorite in the presence of NaOH and water to form the desired end product, 3-isopropylpyrido[3,2-d]pyrimidine - 2,4(1H,3H) - dione. This reaction can be illustrated as follows:

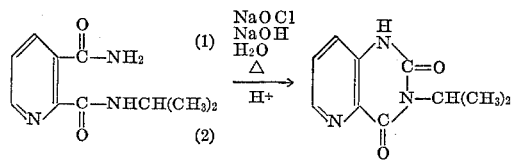

The best yields are obtained when a 1:1:1 mole ratio of amide to sodium hypochlorite to sodium hydroxide is used; however, satisfactory results are achieved when a 1:2:1 mole ratio is used.

In carrying out the process the sodium hypochlorite should first be admixed with sodium hydroxide, then the amide should be added thereto. If the components are not admixed in this manner, there is a tendency for the amide to hydrolyze, resulting in a lower yield. The reaction is self-generating and will proceed in the absence of heat, but the reaction will go faster if the reaction mixture is heated. For that reason it is desirable to heat the reaction mixture to about 80° and hold it there for about ½ hour. Thereafter the mixture is cooled to room temperature and neutralized at which time the product precipitates.

Example A illustrates the preparation of 3-isopropyl-pyrido[3,2-d]pyrimidine-2,4(1H,3H)-dione from $N^2$-isopropyl-2,3-pyridinedicarboxamide.

EXAMPLE A

Preparation of 3-isopropyl-pyrido[3,2-d]pyrimidine-2, 4(1H,3H)-dione

A 22 l. flask equipped with a stirrer and a thermometer, and surrounded by a heating mantle was charged with 8 l. water, 398 g. sodium hydroxide and 9.5 l. aqueous solution containing 595 g. NaOCl. Stirring was commenced, and was continued throughout the reaction. When this charging was complete, the temperature of the charge was 31°; then 1.76 kg. $N^2$-isopropyl-2,3-pyridinedicarboxamide was added to the NaOCl-NaOH solution in the flask. After the pyridinedicarboxamide dissolved, the temperature of the reaction mixture was 33°; the reaction mixture was then heated for a total of about 55 minutes. The temperature after 10 minutes of heating was 40°, after 15 minutes 44°, after 21 minutes 52°, after 25 minutes 60°, and after 55 minutes 63°. The heating mantle was then removed, and the flask was immersed in an ice bath for about 2 hours 50 minutes; the final temperature of the reaction product was 10°. The reaction mixture was then acidified by making a gradual addition of glacial acetic acid to a pH of 6. The rate of addition of acetic acid was controlled so that the temperature of the reaction mixture in the flask remained within the range of 10 to 15°. The 3 - isopropyl-pyrido[3,2-d]pyrimidine-2,4 (1H,3H)-dione product, which had separated as an off-white to cream precipitate, was separated from the mother liquor by filtration, using a Buchner funnel. The final product was washed with tap water and dried in a circulating air oven in which the air was maintained at a temperature within the range of 80 to 100°.

The total recovery of dry product, melting point 238–244°, amounted to 1.48 kg., or 89.8 percent of theory. It was determined by nuclear magnetic resonance analysis that the product was 87 percent, plus or minus 10 percent, 3-isopropyl-pyrido[3,2-d]pyrimidine - 2,4(1H,3H)-dione. The remainder of the product was 3-isopropyl-pyrido[2,3-d]pyrimidine - 2,4(1H,3H)-dione. The presence of the [2,3-d]-family compound is attributable to an impurity in the amide starting material.

The other 3 - substituted-pyrido[3,2-d]pyrimidine-2,4 (1H,3H)-diones, 3 - substituted-pyrido[2,3-d], [3,4-d], and [4,3-d]pyrimidine-2,4(1H,3H)-diones, as well as lumazines referred to herein can be made in a similar manner from other imide intermediates produced by the method of the invention by conversion to an amide, thence formation of the final product from the amide.

All of the compounds of the 3-substituted pyrido [3.2-d]pyrimidine-2,4(1H,3H)-dione and lumazine families made from the imides produced by the method of this invention are intermediates having an unexpectedly high order of herbicidal activity. They have been found to be useful in controlling undesirable plants of both the monocotyledonous and the dicotyledonous species on either a postemergence or a preemergence basis.

By "preemergence" is meant that the compound is applied to the soil prior to emergence of the weed species sought to be controlled. This term, as used herein, also means the application of the herbicidal compounds falling within the scope of this disclosure to areas wherein useful or desirable plants are either growing or have been sown, but where the undesirable plants sought to be controlled have not as yet emerged.

By the term "postemergence" is meant that the compound is applied to the plant sought to be controlled after it has emerged from the soil surface. This term is also used to describe the application of herbicidally active compounds to soil surface in and around growing plants sought to be controlled for purposes of effecting root absorption by the undesirable plant species.

Especially active are the 3-substituted-pyrido[3,2-d] pyrimidine-2,4(1H,3H)-dione compounds where the 3-substituent is isopropyl, se-butyl, cyclohexyl, or benzyl.

The preemergence and postemergence herbicidal activity of 3-isopropyl-pyrido[3,2-d]pyrimidine - 2,4(1H, 3H)-dione achieved at various application rates is shown in Table I below.

In using the compound, seeds of the types of plants set forth in Table I were sown in fresh soil. In the preemergence test the soil was sprayed with a solution of the test compound immediately after the seeds were planted, and before any noticeable growth developed. The solution was about a 2 percent by weight solution of acetone and/or alcohol. The compound was applied at the rate of 16 pounds per acre of soil surface.

Approximately three weeks after spray application, the herbicidal activity of the compound was determined by visual observation of the treated area in comparison with untreated control areas. These observations are reported below in Table I wherein the average activity rating is reported as the percent control of plant growth.

In the postemergence test the soil and developing plants were sprayed approximately two weeks after the seeds were sown. The compound was applied at the rate of 8 pounds per acre from about a 2 percent by weight solution of the test compound in acetone and/or alcohol. The postemergence herbicidal activity was measured in the same way as the preemergence activity; i.e., visual observation approximately eleven days after spraying, and expressed as the percent control of plant growth.

TABLE I

| | Pre-emergence treatment, percent control | Post-emergence treatment, percent control |
| --- | --- | --- |
| Alfalfa | 100 | 90 |
| Corn | 100 | 30 |
| Wild oats | 100 | 70 |
| Cheatgrass | 100 | 50 |
| Foxtail | 100 | 100 |
| Barnyard grass | 100 | 80 |
| Crabgrass | 100 | 100 |
| Nutgrass | 20 | 50 |
| Johnson grass | 100 | 90 |
| Curled dock | 100 | 100 |
| Snapbeans | 100 | 90 |
| Yellow rocket | 100 | 100 |
| Chickweed | 100 | 70 |
| Cucumber | 100 | 100 |
| Pigweed | 100 | 100 |
| Velvetleaf | 100 | 100 |
| Lamb's-quarters | 90 | 100 |

The same solutions of the same compound can also be sprayed, for example along railroad right-of-ways, at an application rate of about 10 to 16 pounds per acre as a total herbicide, i.e., to prevent all vegetation. The other compounds produced from intermediates produced according to the method of the invention can be used as preemergence or postemergence herbicides in a similar manner. In the case of 3-cyclohexyl-pyrido[3,2-d]pyrimidine-2,4(1H,3H) - dione and 3-sec-butyl-pyrido[3,2-d]-pyrimidine-2,4(1H,3H)-dione, substantially the same application rates, e.g., as similar or salt solutions in water, are effective; this is also generally true of the other members of the pyrido[3,2-d]pyrimidine-2,4(1H,3H) - dione family, although slightly higher application rates may be required. 3-benzyl-pyrido[3,2-d]pyrimidine - 2,4(1H,3H)-dione has been found to be peculiarly effective because of its selectivity; for example, applied as described above, at an application rate of 16 pounds per acre, the benzyl compound showed no preemergence herbicidal activity against cucumbers, corn or snapbeans, but total preemergence activity against alfalfa, cheatgrass, crabgrass, curled dock, chickweed, pigweed and lamb's-quarters.

Information concerning the families of compounds above mentioned, applied as described, and discussed above as having a high order of herbicidal activity, is presented in the following table.

TABLE II.—COMPOUND APPLIED

| | Pyrido[3,2-d]pyrimidine-2,4(1H,3H)-dione | | 3-ethyl-pyrido[3,2-d]pyrimidine-2,4(1H,3H)-dione | | 3-propyl-pyrido[3,2-d]pyrimidine-2,4(1H,3H)-dione | | 3-butyl-pyrido[3,2-d]pyrimidine-2,4(1H,3H)-dione | |
|---|---|---|---|---|---|---|---|---|
| | Percent control | | Percent control | | Percent control | | Percent control | |
| | Pre-[1] | Post-[2] | Pre- | Post- | Pre- | Post- | Pre- | Post- |
| Alfalfa | 0 | 0 | 100 | 50 | 100 | 100 | 100 | 50 |
| Corn | 0 | 0 | 10 | 10 | 100 | 60 | 100 | 50 |
| Wild oats | 0 | 0 | 100 | 0 | 100 | 90 | 100 | 100 |
| Cheatgrass | 0 | 0 | 100 | 30 | 100 | 100 | 100 | 100 |
| Foxtail | 0 | 0 | 40 | 40 | 100 | 100 | 100 | 100 |
| Barnyard grass | 0 | 0 | 40 | 10 | 100 | 100 | 100 | 100 |
| Crabgrass | 0 | 0 | 100 | 80 | 100 | 100 | 90 | 100 |
| Nutgrass | 0 | 0 | 10 | 10 | 20 | 70 | 100 | 90 |
| Johnson grass | 0 | 0 | 60 | 60 | 100 | 100 | 100 | 100 |
| Curled dock | 0 | 0 | 100 | 90 | 100 | 100 | 90 | 100 |
| Snapbeans | 0 | 0 | 100 | 80 | 100 | 100 | 100 | 100 |
| Yellow pocket | 0 | 0 | 100 | 100 | 100 | 100 | 100 | 90 |
| Chickweed | 0 | 0 | 100 | 100 | 100 | 100 | 100 | 100 |
| Cucumber | 0 | 0 | 100 | 50 | 100 | 100 | 100 | 100 |
| Pigweed | 0 | 0 | 100 | 90 | 100 | 100 | 100 | 90 |
| Velvetleaf | 0 | 0 | 90 | 100 | 100 | 100 | 100 | 100 |
| Lamb's-quarters | 0 | 0 | 100 | 100 | 100 | 100 | 70 | 10 |

| | 3-sec-butyl pyrido[3,2-d]pyrimidine-2,4(1H,3H)-dione | | 3-allyl-pyrido[3,2-d]pyrimidine-2,4(1H,3H)-dione | | 3-(2-ethylhexyl)pyrido[3,2-d]pyrimidine-2,4(1H,3H)-dione | | 3-cyclopropyl pyrido[3,2-d]pyrimidine-2,4(1H,3H)-dione | |
|---|---|---|---|---|---|---|---|---|
| | Percent control | | Percent control | | Percent control | | Precent control | |
| | Pre- | Post- | Pre- | Post- | Pre- | Post- | Pre- | Post |
| Alfalfa | 100 | 100 | 100 | 100 | 0 | 0 | 100 | 0 |
| Corn | 100 | 90 | 50 | 30 | 0 | 0 | 10 | 0 |
| Wild oats | 100 | 100 | 100 | 20 | 0 | 0 | 80 | 60 |
| Cheatgrass | 100 | 100 | 100 | 30 | 0 | 0 | 100 | 0 |
| Foxtail | 100 | 100 | 90 | 100 | 0 | 0 | 10 | 0 |
| Barnyard grass | 100 | 100 | 90 | 100 | 0 | 0 | 10 | 0 |
| Crabgrass | 100 | 100 | 100 | 100 | 10 | 10 | 100 | 10 |
| Nutgrass | 100 | 100 | 20 | 30 | 0 | 0 | 0 | 0 |
| Johnson grass | 100 | 100 | 90 | 100 | 0 | 0 | 10 | 0 |
| Curled Dock | 100 | 100 | 100 | 100 | 0 | 10 | 100 | 10 |
| Snapbean | 100 | 100 | 100 | 100 | 0 | 0 | 100 | 0 |
| Yellow rocket | 100 | 100 | 100 | 100 | 90 | 90 | 100 | 100 |
| Chickweed | 100 | 100 | 100 | 100 | 70 | 50 | 100 | 100 |
| Cucumber | 100 | 100 | 100 | 100 | 10 | 20 | 100 | 20 |
| Pigweed | 100 | 100 | 100 | 100 | 0 | 100 | 100 | 90 |
| Velvetleaf | 100 | 100 | 90 | 100 | 0 | 0 | 100 | 0 |
| Lamb's-quarters | 100 | 100 | 100 | 100 | 30 | 100 | 100 | 100 |

| | 3-cyclohexyl-pyrido[3,2-d]pyrimidine-2,4(1H,3H)-dione | | 3-cyclooctyl-pyrido[3,2-d]pyrimidine-2,4(1H,3H)-dione | | 3-benzyl pyrido[3,2-d]pyrimidine-2,4(1H,3H)-dione | | Lumazine, 3-isopropyl | |
|---|---|---|---|---|---|---|---|---|
| | Percent control | | Percent control | | Percent control | | Percent control | |
| | Pre- | Post- | Pre- | Post- | Pre- | Post- | Pre- | Post- |
| Alfalfa | 100 | 30 | 100 | 60 | 100 | 0 | 100 | 0 |
| Corn | 90 | 40 | 50 | 0 | 10 | 0 | 10 | 0 |
| Wild oats | 100 | 100 | 100 | 40 | 30 | 0 | 10 | 0 |
| Cheatgrass | 100 | 80 | 100 | 30 | 100 | 0 | 10 | 0 |
| Foxtail | 100 | 100 | 100 | 80 | 90 | 0 | 10 | 0 |
| Barnyard grass | 100 | 100 | 90 | 90 | 90 | 0 | 0 | 0 |
| Crabgrass | 100 | 100 | 100 | 100 | 100 | 40 | 70 | 0 |
| Nutgrass | 100 | 100 | 20 | 10 | 0 | 0 | 0 | 0 |
| Johnson grass | 100 | 100 | 100 | 100 | 90 | 0 | 70 | 0 |
| Curled dock | 100 | 100 | 100 | 100 | 100 | 0 | 100 | 0 |
| Snapbeans | 100 | 80 | 100 | 90 | 10 | 0 | 90 | 30 |
| Yellow rocket | 100 | 100 | 100 | 100 | 90 | 70 | 100 | |
| Chickweed | 100 | 100 | 100 | 100 | 100 | 100 | 60 | 0 |
| Cucumber | 100 | 100 | 90 | 100 | 0 | 10 | 100 | 10 |
| Pigweed | 100 | 100 | 100 | 100 | 100 | 100 | 100 | 0 |
| Velvetleaf | 100 | 100 | 100 | 100 | 90 | 30 | 100 | 0 |
| Lamb's-quarters | 100 | 100 | 100 | 100 | 100 | 60 | 100 | 40 |

| | Lumzaine, 3-butyl | | Lumazine, 3-sec-butyl | | Lumazine, 3-cyclohexyl | | Lumazine, 3-cyclooctyl | |
|---|---|---|---|---|---|---|---|---|
| | Percent control | | Percent control | | Percent control | | Percent control | |
| | Pre- | Post- | Pre- | Post- | Pre- | Post- | Pre- | Post- |
| Alfalfa | 0 | 0 | 100 | 50 | 100 | 100 | 100 | 10 |
| Corn | 0 | 0 | 10 | 0 | 40 | 10 | 30 | 10 |
| Wild oats | 0 | 0 | 30 | 0 | 20 | 10 | 100 | 10 |
| Cheatgrass | 0 | 0 | 90 | 0 | 10 | 50 | 100 | 0 |
| Foxtail | 0 | 0 | 30 | 0 | 20 | 10 | 40 | 50 |
| Barnyard grass | 0 | 0 | 40 | 0 | 20 | 10 | 70 | 90 |
| Crabgrass | 0 | 0 | 100 | 0 | 80 | 20 | 90 | 100 |
| Nutgrass | 0 | 0 | 40 | 0 | 100 | 100 | 30 | 10 |
| Johnson grass | 0 | 0 | 40 | 0 | 30 | 20 | 90 | 100 |
| Curled dock | 0 | 0 | 70 | 50 | 90 | 100 | 100 | 100 |
| Snapbeans | 20 | 0 | 90 | 20 | 100 | 100 | 100 | 100 |
| Yellow rocket | 0 | 70 | 100 | 100 | 100 | 100 | 100 | 100 |
| Chickweed | 90 | 0 | 40 | 0 | 100 | 90 | 100 | 100 |
| Cucumber | 0 | 0 | 10 | 60 | 100 | 100 | 100 | 100 |
| Pigweed | 0 | 0 | 100 | 20 | 100 | 90 | 100 | |
| Velvetleaf | 0 | 0 | 100 | 90 | 100 | 100 | | 100 |
| Lamb's-quarters | 0 | 70 | 100 | 100 | 100 | 100 | 100 | 100 |

[1] Preemergence test: compound applied at rate of 16 lbs./acre.
[2] Post-emergence test: compound applied at rate of 8 lbs./acre.

Of the members of the pyrido[2,3-d] family investigated, only 3 - ethyl - pyrido[2,3-d]pyrimidine - 2,4 (1H, 3H)-dione has been found to have herbicidal activity, and that only of a comparatively low order. For example, applied as described, at an application rate of 16 pounds per acre, the indicated compound was found to provide 100 percent control against snapbeans, 80 percent against chickweed, 80 percent against velvetleaf, 90 percent against nutgrass, and 80 percent against yellow rocket. In addition it had 100 percent control against volunteer soybeans. However, it had no significant control against cheatgrass, wild oats, foxtail, barnyard grass, corn, alfalfa, johnson grass, curled dock, pigweed, cucumber, crabgrass or lamb's-quarters.

The following members of the [2,3-d], of the [4,3-d] and of the [3,4-d] families have been investigated at application rates of 16 pounds per acre, applied as described above, and have been found to have no appreciable herbicidal activity:

3-isopropyl-pyrido[4,3-d]pyrimidine-2,4(1H,3H)-dione
3-phenyl-pyrido[2,3-d]pyrimidine-2,4(1H,3H)-dione
3-cyclohexyl-pyrido[2,3-d]pyrimidine-2,4(1H,3H)-dione
3-isopropyl-pyrido[3,4-d]pyrimidine-2,4(1H,3H)-dione
3-isopropyl-pyrido[2,3-d]pyrimidine-2,4(1H,3H)-dione It will be appreciated from the foregoing discussion that the pyrido[3,2 - d]pyrimidine - 2,4(1H,3H) - dione and the lumazine families of compounds have unexpected utility as herbicides, and that this unexpected utility prevails throughout the families of compounds for which the imides produced by the claimed method are intermediates. For example, the showing of a high order of herbicidal activity for $C_2$ through $C_8$ alkyl substituents in the 3-position (3 - substituted - pyrido[3,2-d]pyrimidine - 2,4(1H, 3H)-dione family) and the demonstration that allyl, as a 3-substituent, has substantially the same order of activity as does an isopropyl substituent in the 3 position shows that alkenyl substituents in the same position impart activity of the same order as is imparted by alkyl substituents and, therefore, demonstrates utility for 3 alkenyl substituents having not more than 8 carbon atoms. Similarly, the demonstration of a high order of activity where the 3-substituent, in the indicated family, is a cycloalkyl group having 3 carbons, 6 carbons and 8 carbons demonstrates the high order of activity for such compounds where the 3-substituent is a cycloalkyl group having from 3 to 12 carbon atoms. Further, the demonstration of selectivity for a 3 benzyl substituent, as well as the showing of a high order of activity therefor, demonstrates utility for aralkyl substituents in the indicated position.

The diones for which the imides produced by the method of the invention are intermediates and which are not unexpectedly useful as herbicides are unexpectedly useful because of their close similarity, from a structural chemical standpoint, to compounds having extremely high orders of activity. This close structural similarity can be appreciated from a consideration of the following formulas:

(1)

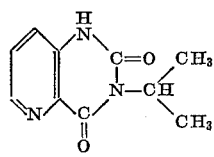

3 - isopropyl - pyrido[3,2 - d]pyrimidine - 2,4[1H,3H)-dione (has a high order of activity)

(2)

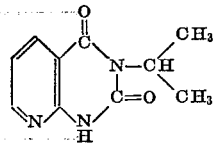

3 - isopropyl - pyrido[2,3 - d]pyrimidine - 2,4(1H,3H)-dione (has no appreciable activity)

The close structural similarities, coupled with the fact reported herein of the significant difference in order of herbicidal activity provides the basis for an orderly investigation, on the basis of molecular models, of the relationship between chemical structure and herbicidal activity, the development of a theory explaining this relationship, and consequent significant advance in the useful arts on the basis of intelligent application of the theoretical explanation by skilled workers in the art.

What I claim is:

1. A method of producing N-substituted 2,3- and 3,4-pyridinedicarboximides and 2,3 - pyrazinedicarboximides which comprises reacting with substantially continuous agitation (a) a compound selected from the group having the general formula

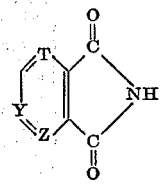

wherein each of T, Y and Z is nitrogen or CH, and at least one is CH, and at least one is nitrogen, and wherein when Y is nitrogen, T and Z are CH with (b) an organic halide of the formula RX wherein R is a member of the group consisting of alkyl groups having from 1 to 8 carbon atoms, substituted alkyl groups having not more than 8 carbon atoms, cycloalkyl groups having from 3 to 12 carbon atoms, alkenyl groups having not more than 8 carbon atoms where the substituent is monocarbocyclic phenyl and alkynyl groups having not more than 8 carbon atoms, and X is chlorine, bromine or iodine, said reaction being carried out under anhydrous conditions at temperatures ranging from about 0 to about 80°, and in the presence of an alkali- or alkaline earth metal hydride and a solvent selected from the group consisting of dimethylformamide, dimethylacetamide, and dimethylsulfoxide.

2. The process of claim 1 wherein R is selected from the group consisting of benzyl, sec-butyl, cyclohexyl, and isopropyl.

3. The process of claim 2 wherein R is isopropyl.

4. The process of claim 1 wherein said solvent is dimethylformamide.

5. The process of claim 1 wherein Z is nitrogen, and Y and T are carbon.

6. The process of claim 1 wherein Y is nitrogen.

7. The process of claim 1 wherein T and Z are nitrogen.

8. The process of claim 1 wherein X is chlorine.

9. Compounds of the formula

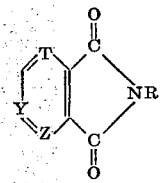

wherein each of T, Y and Z is nitrogen or carbon and at least one is carbon and at least one is nitrogen, and wherein when Y is nitrogen, T and Z are carbon, and R is a member of the group consisting of alkyl groups having from 1 to 8 carbon atoms, alkenyl groups having not more than 8 carbon atoms, and alkynyl groups having not more than 8 carbon atoms.

10. The compound of claim 9 wherein R is an alkyl group having from 1 to 8 carbon atoms.

11. The compound of claim 9 wherein T and Y are carbon, and Z is nitrogen, R is isopropyl or seco-butyl.

References Cited

UNITED STATES PATENTS 3,431,262   3/1969   Wendt et al. _____ 260—250

NICHOLAS S. RIZZO, Primary Examiner

U.S. Cl. X.R.

260—295, 256.4; 71—92